(12) United States Patent
Barberis et al.

(10) Patent No.: US 7,596,377 B2
(45) Date of Patent: Sep. 29, 2009

(54) SYSTEM AND METHOD FOR PLANNING A TELECOMMUNICATIONS NETWORK FOR MOBILE TERMINALS

(75) Inventors: Sergio Barberis, Turin (IT); Indro Francalanci, Turin (IT); Nicola Magnani, Turin (IT); Loris Stola, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 10/415,254

(22) PCT Filed: Oct. 22, 2001

(86) PCT No.: PCT/IT01/00533

§ 371 (c)(1),
(2), (4) Date: Jun. 3, 2003

(87) PCT Pub. No.: WO02/35872

PCT Pub. Date: May 2, 2002

(65) Prior Publication Data

US 2004/0014476 A1     Jan. 22, 2004

(30) Foreign Application Priority Data

Oct. 27, 2000   (IT)  ............................ TO2000A1017

(51) Int. Cl.
*H04W 40/00*    (2009.01)

(52) U.S. Cl. ........................ 455/446; 455/449; 370/328; 370/335; 370/342

(58) Field of Classification Search ................. 455/446, 455/47, 448, 449, 450, 451, 452.1, 452.2, 455/453, 454, 447; 370/241, 328, 335, 342
See application file for complete search history.

(56) References Cited

U.S. PATENT DOCUMENTS

| | | | | |
|---|---|---|---|---|
| 5,561,841 | A | * 10/1996 | Markus | ....................... 455/446 |
| 5,710,758 | A | 1/1998 | Soliman et al. | ............. 370/241 |
| 6,094,580 | A | 7/2000 | Yu et al. | ..................... 455/446 |
| 6,097,957 | A | * 8/2000 | Bonta et al. | ................. 455/446 |
| 6,173,168 | B1 | * 1/2001 | Andersson | ............... 455/404.1 |
| 6,487,414 | B1 | * 11/2002 | Tanay et al. | ................. 455/450 |
| 6,553,233 | B1 | * 4/2003 | Lee et al. | ..................... 455/446 |
| 6,636,739 | B1 | * 10/2003 | Fagen et al. | ................. 455/453 |

OTHER PUBLICATIONS

Software Tools for the Optimisation of Resources in Mobile Systems ( Project No. AC016).

* cited by examiner

*Primary Examiner*—Quochien B Vuong
(74) *Attorney, Agent, or Firm*—Banner & Witcoff, Ltd.

(57) ABSTRACT

The present invention relates to a system and method for planning networks for mobile terminals that use a radio interface based on the Code Division Multiple Access or CDMA technique. More particularly, the system and method provide a step 500 whereby the Service Areas in these networks can be calculated using, as a reference, Domains calculated by means of a step 300 on the basis of real propagation models and taking a predetermined or estimated traffic into account on a pixel by pixel basis. In addition, the system and method make it possible to calculate the Macrodiversity Areas by means of a step 700, and thus to take the areas in which mobile terminals are capable of exchanging information with more than one radio base station into account at the planning step.

17 Claims, 2 Drawing Sheets

SYSTEM AND METHOD FOR PLANNING A TELECOMMUNICATIONS NETWORK FOR MOBILE TERMINALS

FIELD OF THE INVENTION

The present invention relates to a system and method for planning a telecommunications network for mobile terminals comprising a plurality of cells distributed over a particular geographical area or territory.

More particularly, the present invention relates to a system and method for planning a third generation UMTS (Universal Mobile Telecommunications System) network for mobile terminals which uses, as is known, a radio interface based on the Code Division Multiple Access or CDMA access technique.

BACKGROUND OF THE INVENTION

Networks for mobile telecommunications terminals are known in the prior art. These networks are in general referred to as cellular inasmuch as they are characterized by a plurality of cells, each defined as the set of points or pixels in the geographical area which are served by the radioelectric signal radiated by an antenna.

Among known cellular networks, those which use the CDMA access technique are distinguished by the fact that the same frequency band (channel) can be used in different cells. As a result, handover, or in other words the techniques employed when a mobile terminal moves from one cell to another adjacent cell, can be managed by using the same frequency. Such techniques are called soft handover, which is a mechanism that enables the mobile terminal to decode signals when it is located in certain areas referred to as soft handover or macrodiversity areas, and thus exchange information with several antennas and, consequently, several radio base stations (RBSs). Naturally, identifying and dimensioning the macrodiversity areas is extremely important as regards the correct operation and dimensioning of cell equipment, since a mobile terminal implementing the macrodiversity mechanism will obviously use resources from all of the radio base stations to which it is simultaneously connected.

A further distinguishing feature of UMTS networks consists in the fact that these networks are capable of providing a plurality of "services", examples of which include:
Telephony
Fax
Video telephony
Internet access In general, moreover, each of these services has characteristics in terms of speed (bit rate) and traffic (quantity and whether the traffic is symmetrical or asymmetrical) which are specific for the service concerned. It follows that the factors to be taken into account when dimensioning cells include both the characteristics of each service, and any groupings of services on a single radio carrier as envisaged by the CDMA access technique. Like all cellular mobile radio systems, UMTS features common control channels that are broadcast over the entire cell area. These channels contain system information which is indispensable for the mobile terminals. Because of these particular characteristics, UMTS network planning is thus a complex activity that calls for approaches differing substantially from those hitherto used for earlier types of cellular network such as GSM (Global System for Mobile Communication) or IS-95 (Interim Standard).

There are a number of prior-art systems and methods for planning mobile terminal networks which use the CDMA access technique. For example, the document AC016/CSE/MRM/DR/P/091/a1 entitled "STORMS Project Final Report" describes the system and method developed as part of the STORMS project (Software Tools for the Optimization of Resources in Mobile Systems) promoted by the European Commission.

The prior-art method and system are characterized by three main steps:

A first step 10 (FIG. 1) called "Initial Dimensioning" consists of calculating maximum cell dimensions on the basis of theoretical propagation models for any given service. For calculation in this step 10, cells are by convention considered to be hexagonal and traffic is considered to be uniformly distributed over the geographical area concerned.

Figure 1:
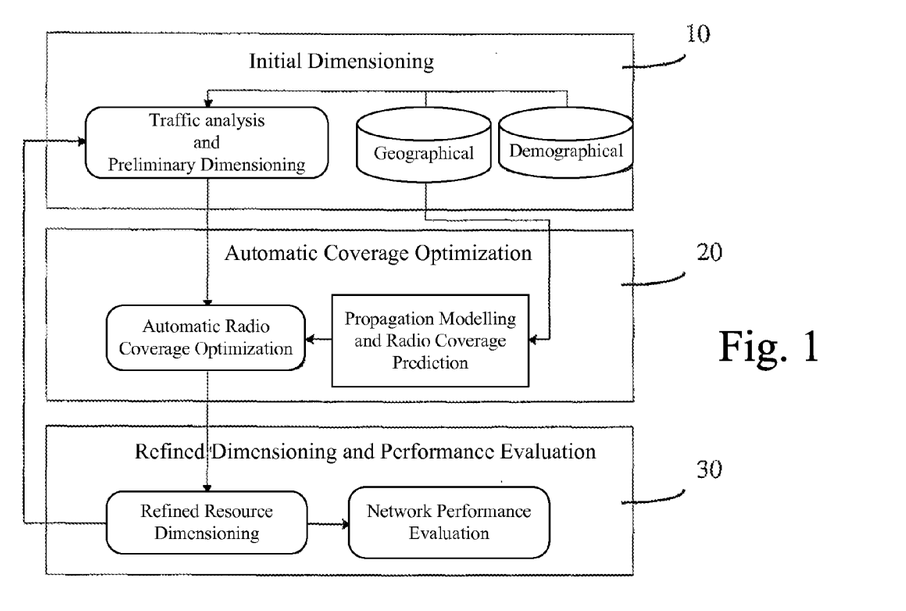
FIG. 1 represents a flow chart for a mobile telecommunications network planning method in accordance with the prior art.

A second step 20, called "Radio Coverage Optimization", consists of calculating the dimensions of the cells' so-called "service area" for any given service or for mixed services, taking the specific propagation models for the geographical area concerned into account. In this step 20, calculation considers that the cells are mutually exclusive and that there are thus no geographical areas (pixels) implementing macrodiversity.

A third step 30, called "Fine Cell Dimensioning", is designed to calculate the actual dimensions of the cells for any given service or for mixed services in cases where a single carrier is used for multiple services. In this step, both propagation and the actual traffic in the geographical area are taken into account, as is the effect of the power control function.

In this final step 30, calculation is performed through successive approximations and leads to a real network plan.

On the whole, the prior art method is very slow to converge on a real network plan because of the approximations introduced in the first two calculation steps (10 and 20), which mean that the third step is invariably necessary. Consequently, the prior art method is actually usable only at the end of the planning process, since all of the parameters required for correct network planning are taken into consideration only in the final step 30.

In addition, the prior art method is not capable of providing information about the dimensions of the macrodiversity areas, even though these areas are particularly critical because they make it necessary to use an amount of network equipment in excess of that required by the actual traffic density, given that the mobile terminals in these areas communicate with several units simultaneously.

Essentially, the prior art method and system, though providing a solution to the problem of dimensioning networks using the CDMA access technique, are slow, fail to furnish realistic intermediate results, and neglect macrodiversity, which is one of the factors that is most difficult to manage for any operator who intends to provide third-generation network services.

DISCLOSURE OF THE INVENTION

The object of the present invention is the implementation of a system and method which does not have the limitations of the prior art methods as described above. More particularly, the object of the present invention is a planning system and method in which real or realistic data are used from the outset so that each step is able to provide realistic results which are extremely close to final planning results.

Thus, the object of the present invention is the implementation of a system and method capable of providing processing times which are much shorter than those for prior art systems and methods at an early step, e.g., at the time a network is dimensioned for the purposes of a tender competition.

This object is achieved by the system and method as described in the independent claims.

In accordance with another feature of the present invention, the system and method make it possible to calculate and dimension the macrodiversity areas and thus to provide this information, which is of significant importance as regards correct dimensioning of networks using the CDMA access technique, as do the UMTS networks.

BRIEF DESCRIPTION OF THE DRAWINGS

The above and other features of the present invention will be better understood from the following description of a preferred embodiment of the invention, which is intended purely by way of example and is not to be construed as limiting, taken in conjunction with the accompanying drawings, where.

DESCRIPTION OF A PREFERRED EMBODIMENT OF THE INVENTION

Figure 2:
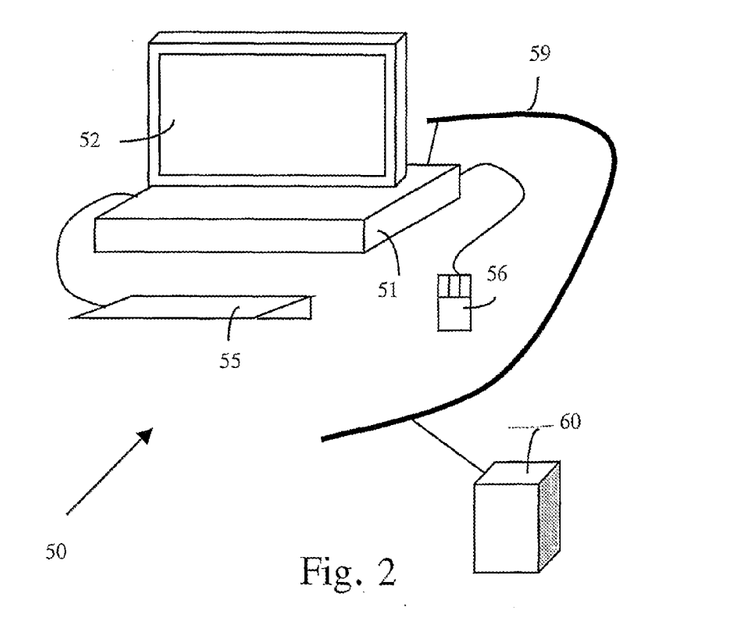
FIG. 2 represents a system for dimensioning a mobile telecommunications network in accordance with the invention.

A system for planning a telecommunications network of mobile terminals (mobile terminals) will be described with reference to FIG. 2, said system comprising, for example, a computerized work station (work station) 50 of known type, having a processor sub-system (base module) 51, a display 52, a keyboard 55, a pointing device (mouse) 56 and means for connection to a local area network (network connection) 59. The work station 50, for example a Hewlett-Packard J5000 with a 450 MHz CPU, 1 Gbyte RAM, 18 Gbyte hard disk and UNIX operating system, is capable of processing groups of programs or modules and of presenting the results on display 52, as will be described in detail below with reference to the method in accordance with the invention.

The system in accordance with the invention also comprises a disk sub-system 60 of known type which is connected by means of network connection 59 to the work station 50 and is capable of storing reference databases in memory as will be described in detail below with reference to the preferred embodiment of the invention.

Naturally, if the databases are of limited size they can be stored on the hard disk of work station 50 without departing from the scope of the invention.

In the described configuration, the system is capable of permitting mobile network planning on the basis of computer program modules (modules) implemented in order to execute the method in accordance with the invention and with the aid of databases stored in the disk sub-system 60.

The mobile network planning method comprises a plurality of steps that can be grouped into four logic blocks.

A first block 1000 (FIG. 3): data preparation for network planning.

Figure 3:
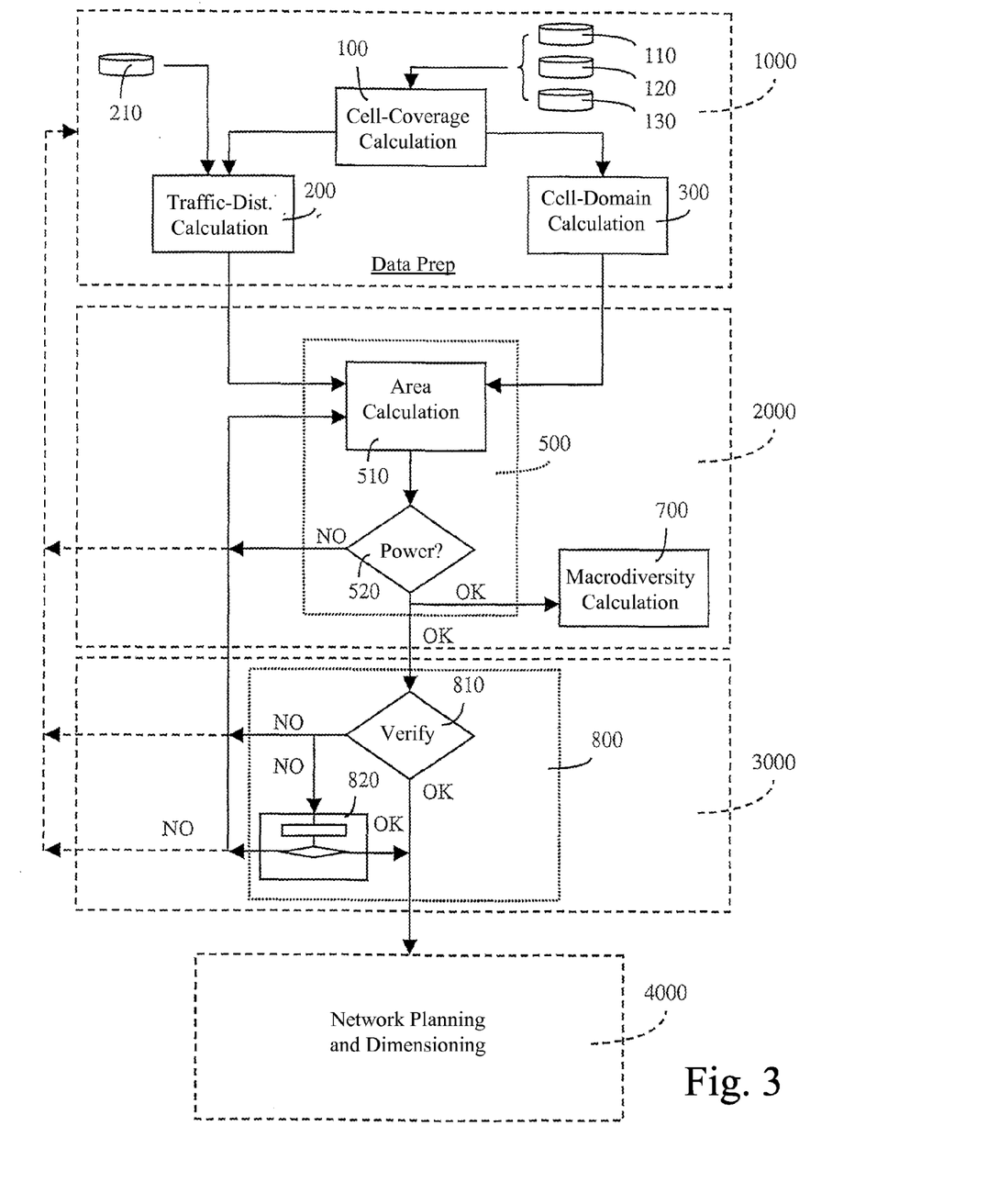
FIG. 3 represents a flow chart for the method used for dimensioning a mobile telecommunications network in accordance with the invention.

A second block 2000: network planning and dimensioning by considering radio-link from the mobile terminal to the radio base station (uplink).

A third block 3000: uplink dimensioning verification.

A fourth block 4000: network planning and dimensioning by considering radio-link from the radio base station to the mobile terminal (downlink).

The first three blocks 1000, 2000 and 3000 include steps that are new with respect to the prior art and will thus be described in detail. In the method according to the invention, the fourth block 4000 does not introduce features that are novel with respect to the prior art; the document cited in the background of the invention should thus be consulted for information concerning the details of this block.

The data preparation block 1000 comprises the following steps:

Cell Coverage Calculation (Coverage calculation) 100;
Cell Domain Calculation (Domain calculation) 300; and
Calculation/Forecasting of traffic distribution in the geographical area (traffic distribution calculation) 200.

The Coverage calculation step 100 is of known type and makes it possible to calculate the dimensions and characteristics of each coverage area, i.e., the point or pixel location where the radioelectric signal is received within a given radius (80 km, for example) from the unit (antenna) radiating it.

As calculation is independent of the characteristics of the radio interface, it can be used to plan networks of differing types and uses the following databases:

Geographical database 110, of known type, which contains the altitude characteristics of the geographical area;

Urbanization database 120, of known type, which contains characteristics of the buildings in the geographical area in grids of selectable dimensions (e.g., 50 by 50 m);

Morphological database 130, of known type, which contains a description of the geographical area based on morphological classes (forested, lakeside, etc.) which, as is known, influence radioelectric signal propagation in varying ways; and Site database 140, of known type, which comprises
  Power emitted by site equipment in the cell;
  Antenna radiation pattern;
  Geographical position of the antenna;
  Antenna tilt; and
  Height of the antenna relative to the ground.

Coverage in a geographical area where network planning must be performed is calculated by applying well known approximations of Maxwell's laws to the information contained in the aforesaid databases.

Processing is automatic for a given geographical area and is capable of presenting coverage areas on the display 52 (FIG. 2 and FIG. 3) of the work station 50.

As will be readily apparent to a person skilled in the art, coverage areas are not mutually exclusive, and there will thus be areas of intersection containing pixels "covered" by more than one antenna.

The Domain calculation step 300 uses the coverage areas calculated in step 100 as input data and, for each coverage area, makes it possible to calculate the cell "domain", or in other words the point or pixel location where the radioelectric signal can be decoded by a mobile terminal in the presence of thermal noise only.

Domain calculation is a process specific to UMTS networks and to the downlink, and is carried out by taking the family of services with the loosest limits (i.e., the service or family of services which requires the lowest received power in order to decode the radioelectric signal) as a reference.

In particular, the domain of each cell is calculated by checking whether the radioelectric signal is received at each pixel in the coverage area with a power that exceeds the threshold determined on the basis of the service with the loosest requirements.

The domain calculation step 300 is new with respect to the prior art, where domains are considered as a starting point, or in other words as hexagonal cells to which the "Radio Coverage Optimization" step 20 (FIG. 1 and FIG. 3) is to be applied.

In addition, the domain calculation step 300 provides the novel feature of outputting processed and calculated data, which are firmly based on realistic propagation models for the area concerned, to the subsequent planning steps. As will be readily apparent to a person skilled in the art, the domains are not mutually exclusive, and there will thus be areas of intersection containing pixels belonging to more than one domain.

Processing is automatic for each coverage area and is capable of presenting the domains and pixels of which it consists on the display 52 (FIG. 2 and FIG. 3) of the work station 50.

In particular, the module implemented for the Domain calculation step 300 is capable of displaying domains in various ways. For example, it can display the pixels of an individual domain in a single color or in different colors. Alternatively, information can be displayed as a function of pixel depth or attenuation. The module is also capable of displaying the set of domains, e.g., within a given geographical area, highlighting each domain in a particular color and assigning the pixels with the least depth to each domain by means of the same color.

For each domain pixel, processing is also capable of providing certain items of information that are essential for the subsequent steps, including:
  Field/Attenuation.
  Pixel depth or relative position for the various associated domains or domain cells.
  Membership, i.e., an indication of the domain cell that prevails for a determined pixel, inasmuch as it shows the least attenuation.

The traffic distribution calculation step 200 makes it possible to calculate or estimate the traffic offered for each service by unit of area (pixel).

The fact that calculation is performed pixel by pixel is an essential feature of the method described.

The implemented module makes it possible to use three possible approaches in performing calculation.

In the first approach, a traffic database 210 consisting of traffic measurements, e.g., of GSM voice traffic on a coverage or cell coverage basis, is used as reference information. This information is then extrapolated to estimate total voice, fax and videophone traffic. Calculation is carried out, for the geographical area where network planning must be performed, by applying the following formula:

$$t_{m,n} = (\rho_{m,n} * T_{tot})/\Sigma(\rho_{m,n}) \quad\quad 1$$

where:

$t_{m,n}$ is the estimated traffic for the pixel;

$\rho_{m,n}$ is the probability of pixel traffic $t_{m,n}$ taken from the traffic database 210 or estimated on the basis of morphological information for the geographical area and the amount of this area which is covered by roads and buildings, and by associating different probabilistic weights to the aforesaid information; and $T_{tot}$ is the total traffic taken from database 210 or a traffic estimate based on the data supplied by database 210.

Once the various $\rho_{m,n}$ values have been defined, processing with this type of approach is automatic.

The second approach involves a manual procedure, where a polygon is drawn on the geographical area and the $t_{m,n}$ values obtained with the first approach are modified pixel by pixel inside this polygon. Once the polygon has been defined, traffic is calculated automatically pixel by pixel, maintaining the total traffic $T_{tot}$ associated with the polygon constant.

In the third approach, the pixel-by-pixel $t_{m,n}$ traffic values for the geographical area where network planning is to be performed are loaded manually, e.g., on the basis of data provided by a marketing office.

Whichever approach is used, the implemented module is capable of presenting pixel-per pixel traffic $t_{m,n}$ for any given service or family of services in the coverage areas on display 52 associated with work station 50 (FIGS. 2 and 3), using different pixel colors in relation to traffic intensity.

By means of the domain calculation step 300 and the traffic distribution calculation step 200, the data preparation block makes it possible to supply data to the subsequent steps whose information content differs from that in the prior art and is essential for correct dimensioning of networks using the CDMA access technique.

The network planning and dimensioning block 2000 comprises the following steps:
  Service Area calculation 500; and
  Macrodiversity Area calculation 700.

The Service Area calculation step 500 comprises two sub-steps, viz., a first Area calculation sub-step (area calculation step) 510 in which actual calculation is carried out, and a second step (power verification step) 520 which checks for "outage" areas resulting from limited mobile terminal power.

The Area calculation step 510 uses the traffic information as calculated in step 200 and the domain information as calculated in step 300 to dimension the "service area" of each cell, or in other words the set of points or pixels in which the Service or, where applicable, the set of UMTS services combined on a single radio carrier (service family) can actually be provided.

Service areas are exclusive, in the sense that each pixel belongs to a single service area, and cannot be larger than the associated domain.

Uplink-based calculation is performed using the following formula, which is of known type:

$$\eta = \sum_{s=1}^{S} n_s * SAF_s * (1 + f_s) * SNR_s \quad\quad 2]$$

where:

$\eta$ is the cell loading factor, or in other words the ratio of the cell load that will be accepted to the maximum load (also called the pole capacity) at which the system is unstable, as will be described in greater detail below;

$n_s$ is the maximum number of users who can be simultaneously active in the cell for the s-st service, and is determined on the basis of traffic as calculated in the step 100;

$SAF_s$ is the Service Activity Factor of the s-st service and is estimated a priori with typical values; for the Telephony service, for example, it is 0.5;

$f_s$ is the ratio of intercell interference to intracell interference and is estimated a priori and subsequently verified, as will be apparent from the description below;

$SNR_s$ is the signal to noise ratio for the s-st service and has a typical value for each service.

The procedure for identifying the service area is innovative and is carried out cell by cell as follows:

Starting from the pixel which is electromagnetically "closest" to the antenna (or in other words from the pixel with the lowest link loss), the implemented module proceeds by "moving away" towards pixels with higher loss, iteratively adding the various pixel's traffic contributions to the loading factor until a predetermined limit $\eta_{lim}$ (typically equal to 0.6-0.7) is reached or until the domain's pixels come to an end.

In particular, calculation is carried out by domain and by contention with other domains, the trajectory for selecting the pixels to be inserted in the Service areas is determined by the attenuation values calculated in the domains, and the weight for calculating $\eta$ is determined by the traffic values calculated in step 200.

This method is in line with the characteristics of the CDMA technique, which tends to minimize the power transmitted by the mobile units, and thus reflects the operation of the currently deployed UMTS network.

In cases where a pixel can belong to more than one service area, the condition described above is observed in such cells; consequently, this pixel is assigned to a particular service area on the basis of the depth calculated in step 300. In other words, it is assigned to the service area which requires the lowest transmitted power (estimated considering both attenuation or depth and the noise raise as defined below).

For each domain, it is thus possible to identify the associated service area and the effective value of $\eta$ (which is always lower or, at most, equal to the established limit value unless quantization errors occur).

Service area calculation concludes with the mobile terminal power verification step 520, where a number of simplifying assumptions introduced in step 510 are verified. In particular, two simplifying assumptions are made in calculating the service area:

The first assumption is that mobile terminal power is unlimited.

The second assumption is that the value of $f_s$ has been correctly estimated.

In this step 520, which is novel with respect to the prior art, a check is performed to determine whether the first simplifying assumption is correct.

The check is performed pixel by pixel and for each service or family of services by comparing the actual characteristics of the mobile terminal with the characteristics required by the simulated service.

In particular, the mobile terminal's power class (Pmob), i.e., the maximum power that the mobile terminal can deliver, must be greater than: loss (Att), radio base station sensitivity (Psrb) for the service, and noise raise (P). Consequently, the following outage condition expressed in decibels (dB) must be verified pixel by pixel:

$$Psrb_s + Att + P > Pmob \qquad 3$$

where

Psrb$_s$ is a characteristic of the radio base station and corresponds to the minimum power which can be detected by the unit for decoding the service;

Att is the link loss determined in the preceding steps, and

P is equal, in linear units, to $1/(1-\eta)$ and corresponds to the "noise raise", i.e., to the additional power in dB that the mobile terminal must transmit in order to overcome the interference caused by other mobile terminals.

If, as in formula 3], the value obtained from the sum is greater than the mobile terminal's power class, the pixel must be removed from the cell service area and regarded as being in outage conditions if it cannot be included in another service area.

Obviously, the value of $\eta$ must be updated along with the powers of the other pixels in the service area.

The check sequence in accordance with the present invention considers pixels in the opposite order to that used to define the service areas. In other words, the sequence starts from the pixels showing the highest loss and proceeds towards the radio base station in order of decreasing loss.

The verification step 520 ends when all pixels in all service areas show a power which is compatible with the mobile terminal's class.

The implemented module must check that the pixels regarded as being in outage conditions cannot be served by other cells. To this end, the power that a generic mobile terminal would be required to use in order to connect to the cells that are electromagnetically adjacent to that whose service area has been removed is calculated for each pixel in outage conditions. If a cell that is compatible with the mobile terminal's power class is identified, the pixel is added to the service area of this cell and the value of $\eta$ is updated along with the power values of all the pixels in that service area.

Adding a new pixel to a cell's service area can cause any pixels whose loss is higher than that of the new pixel to go into outage conditions (it should be noted that pixels with lower losses cannot be discarded as a result of adding the new pixel). In such cases, a chain reaction can potentially be triggered which propagates among the adjacent service areas, but which converges in two possible solutions; in the first, a cell is found which can acquire new pixels without losing others, while in the second, "borderline" pixels (i.e., those served with higher loss) are discarded and put into outage conditions.

Processing for steps 510 and 520, which make up the service area calculation step 500, is automatic within the geographical area to be planned and for each service area which "covers" this geographical area. Processing is capable of presenting the service areas and the pixels of which they consist on the display 52 (FIG. 2 and FIG. 3) associated with the work station 50.

In particular, the module implemented for the service area calculation step 500 is capable of displaying, for example in a particular geographical area, each service area in a single color or different colors for varying cell loads.

Alternatively, the module is capable of displaying the pixels for each service area in different colors for varying losses. The entire service area calculation step 500 has at least three features which are novel with respect to the Radio Coverage Optimization step 20 (FIG. 1 and FIG. 3) described in the background of the invention, viz.:

As reference cells for performing calculations, it uses domains calculated on the basis of actual propagation models, rather than domains of conventional (hexagonal) shape;

It takes pixel-by-pixel traffic into account; and

It takes mobile terminal power into account during verification.

The Macrodiversity Area calculation step 700 is capable of identifying the pixel location where the mobile terminal can decode the signal originating from more than one radio base station.

As indicated earlier, identifying these areas is essential both because macrodiversity is important for the correct operation of CDMA systems (and it is thus necessary to determine that macrodiversity in fact exists) and because the size of the identified areas has an impact on cell equipment dimensioning: in fact, a mobile terminal implementing the macrodiversity mechanism uses resources from all of the radio base stations to which it is connected.

The procedure used to identify macrodiversity areas is as follows: for each service area, the pixels outside that area but inside the corresponding domain are analyzed, and a check is carried out to determine whether these pixels can be "served" using the macrodiversity mechanism.

In performing this procedure, the following factors are defined as will be described in detail below:

A maximum threshold Γ for the difference in a pixel's loss relative to two radio base stations to whose domains this pixel belongs;

The maximum number of cells to which a mobile terminal can be locked for a given service or family of services.

In particular, it is assumed that all the cells for which $\eta < \eta_{lim}$ can accept pixels outside their service area in order to implement the macrodiversity mechanism. It is also assumed that all pixels for which the difference between the field value received by the cell to whose service area they belong and the adjacent cell in question is less than a predetermined threshold Γ are possible candidates for macrodiversity.

Considering only the cells for which $\eta < \eta_{lim}$ is justified by the fact that, in currently deployed CDMA networks, the power of the common channels (pilot signal) varies according to cell load. For cells that have reached the load limit ($\eta_{cell} = \eta_{lim}$), the method thus assumes that the common channel power is reduced so as not to permit decoding outside of the service area, thus making it impossible for a cell to become a candidate for macrodiversity.

The calculation method is new and automatic, and consists of selecting a pixel which is outside the service area but inside the domain for each cell regarded as a candidate for accepting pixels implementing the macrodiversity mechanism, and of calculating the load increase that the pixel in question would cause for the candidate cell if it belonged to the latter's service area. In particular, an $\eta_{equiv}$ is calculated for this pixel; if this value added to any macrodiversity contributions accepted earlier and to $\eta_{cell}$ provides a result which is less than $\eta_{lim}$, the pixel is considered as implementing macrodiversity for the candidate cell.

It should be noted that the value of $\eta_{cell}$ does not vary as a result of having accepted a pixel implementing macrodiversity, given that a cell's load in terms of noise contributions is given exclusively by the traffic inside its service area.

The procedure described above, which calculates the load increase as if the pixel in question belonged to the service area of the candidate cell, makes it possible to take account of the occupation of radio base station resources dedicated to user signal decoding. A user implementing the macrodiversity mechanism, in fact, employs these resources in all of the radio base stations with which it is implementing the macrodiversity mechanism. Obviously, the model considered here assumes that the resources in question have been dimensioned to support a load equal to $\eta_{lim}$.

The module implemented for the macrodiversity area calculation step 700 is capable of presenting the macrodiversity areas and the pixels of which they consist, which generally belong to two or three cells, in appropriate colors on the display 52 (FIG. 2 and FIG. 3) associated with the work station 50.

In particular, the module implemented is capable, for example, of using three different colors to display the pixels served by three cells, the pixels served by two cells, and the pixels served by a single cell in a given geographical area.

The uplink dimensioning verification block 3000 comprises a single step:

checking of the areas which are in "outage" conditions because of a low carrier to interference ratio (C/I) or step 800.

This step 800 does not affect the macrodiversity area calculation step 700, but makes it possible to fine-tune the dimensions of the service area during actual network planning.

As indicated in the description of step 520, service area calculation is also based on the assumption that the value of f has been correctly dimensioned and thus takes intracell and intercell interference into account correctly.

Though this simplification makes it possible to obtain easily used formulas, it also introduces approximations that could prove to be excessive.

In cases where the actual details of the systems to be installed must be specified, it is thus necessary to perform a more precise analysis which is capable of modeling power control behavior and the real impact of intracell and intercell interference.

The reference verification method 820, which is taken from the STORMS project, uses an iterative approach as described in the reference document cited in the background to the invention.

In accordance with the present invention and as a preliminary step to the known iteration method, a simplified verification procedure 810 is here proposed which, as it does not call for iterations, lends itself to particularly fast software implementation and thus makes it possible to fall back on the iterative approach only in cases where the simplified check is unsuccessful.

This new approach to step 800 is particularly useful in tender competitions, as network dimensioning can be performed in extremely short times without running known iterative processes.

As described above for step 520, outage areas caused by limited mobile terminal power, were checked by calculating the power that a generic mobile terminal would have had to transmit, for each pixel in each cell's service area and for each service, as a function of radio base station power, loss towards the radio base station, and the noise rise calculated on the basis of $\eta_{cells}$.

It is thus possible to use this information to calculate the carrier to interference ratio (C/I) on the uplink for each pixel and for each service, and to check that this ratio satisfies the requirements of the service.

If this verification procedure 810 yields a positive result for all pixels, it is no longer necessary to proceed with the known iterative step 820, and it can be concluded that the simplifying assumptions introduced in the second block (network planning and dimensioning) have not introduced excessive approximations.

If the simplified verification procedure 810 yields a negative result for a few pixels, it is still possible, particularly in cases involving tender competitions, to conclude that the error level is acceptable, and that the iterative process will be necessary only at the actual dimensioning step.

Alternatively, step 500 can be reiterated, modifying the value of $f_s$ empirically.

Only in the unfortunate case where the simplified verification procedure 810 yields a predominantly negative result will it be necessary to fall back on the iterative approach 820 in accordance with the prior art.

Though the simplified check 810 proposed here in accordance with the present invention uses concepts which are well known in the literature, it is not applicable in the context of the prior art and shows itself to be particularly useful inasmuch as it can reduce the total processing times involved in planning a UTMS network by a substantial amount, i.e., by several numerical factors.

It should be noted that step 800, if performed only using the simplified verification procedure 810 described herein, is conceptually part of the second block 2000 (planning and dimensioning). With this simplifying assumption, it can thus be concluded that a UMTS uplink can be planned and dimensioned in accordance with the present invention using only the first two blocks.

On the basis of the foregoing description, the flow of activities involved in planning a network for mobile telecommunications terminals is as follows.

Once the geographical area for which the network is to be planned has been chosen, the first block 1000 is activated on the workstation 50 by means of the keyboard 55 and the mouse 56.

For example, taking a particular region as the geographical reference and establishing that the sites which are already present in the site database 140 are to be used, the designer activates the module implemented for the coverage calculation step 100, followed by the module implemented for domain calculation 300.

Naturally, if the designer does not consider the position of the sites to be satisfactory, new sites can be entered by means of the mouse 55 and keyboard 55, and the above modules can then be activated in order to take the new situation into account.

The domain calculation module 300, in addition to making it possible to obtain a set of data which are important for subsequent processing, is also capable of presenting visual indications of any critical situations on the display 52, particularly as regards the depth or attenuation levels of the various pixels for the domains, which are displayed in such a way as to permit the designer to reassess site placement where necessary.

Independently of the domain calculation step 300, the module which implements the traffic distribution calculation step 200 is activated, e.g., in parallel, on the basis of the results obtained with the coverage calculation step 100. Naturally, traffic distribution is calculated for the geographical area determined previously.

This step makes it possible to assign specific quantities of traffic for any given service or family of services to the individual pixels in the geographical area, and to prepare this data for the subsequent steps. Here again, data presentation on the display 52 makes it possible to highlight any critical situations which the designer can resolve, for example by reviewing site positions or combining service families.

With the completion of the domain calculation step 300 and the traffic distribution step 200, the first block 1000 is concluded and it is possible to proceed to the second block 2000, which is a further characteristic feature of the present invention.

The service area calculation step 500 precedes the macrodiversity area calculation step 700 and is essential for dimensioning UMTS networks.

As indicated earlier, the service areas are mutually exclusive, and displaying these areas thus makes it possible to identify zones in which a particular service or family of services are not available.

Through the use of different colors, moreover, it is possible to identify high-load service areas, or in other words those cells where $\eta_{cell}$ is very close to $\eta_{lim}$.

Naturally, the values obtained with the service area calculation step and the associated presentation on the display can indicate a need to review the data used in the first block 1000.

Once the service area calculation step 500 has been completed, the macrodiversity area calculation step 700 is activated in sequence 700.

Presenting the macrodiversity areas on the display 52 associated with work station 50 is extremely important, as it makes it possible to highlight the zones in which the equipment operating in the cells is loaded both by actual traffic and by soft handover traffic. Naturally, the extent to which equipment is subject to soft handover traffic will increase along with the size of the macrodiversity areas.

The service area calculation step 500, which may incorporate the simplified verification step 810, and the macrodiversity area calculation step 700 complete the second block 2000 and, in general, provide results that are reliable both for use in tender competitions and for actual dimensioning without having to resort to iterative steps, unless special situations arise in which certain parameters can lead to unreliable results for a variety of reasons.

In any case, however, the method in accordance with the present invention makes it possible to verify the reliability of results and thus determine whether or not it is necessary to employ the third block 3000, i.e., the step 800 that checks the areas which are in outage conditions because of a low carrier to interference ratio C/I.

Completion of block 2000 also enables the designer to proceed with the network downlink planning and dimensioning block 4000 on the basis of the data thus obtained.

The dimensions, forms, materials, components, circuit elements and contacts as contemplated in the foregoing description are capable of modifications in various obvious respects, as are the details of the circuitry and construction as illustrated and of the operating method, all without departing from the scope of the invention as specified in the appended claims.

The invention claimed is:

1. A method for planning a telecommunications network for mobile terminals in which the network employs CDMA access techniques and comprises a plurality of Coverage Areas in a geographical area, each Coverage Area comprising an antenna that radiates a radio-frequency signal and a plurality of elementary geographical areas or pixels in which the radio-frequency signal is received by the mobile terminals, the method comprising:

I) a first group of data preparation steps comprising at least
   a) estimating values of offered service traffic for each of the pixels, and
   b) calculating a Domain in each of the Coverage Areas, each Domain including pixel locations in which the radio-frequency signal exceeds a predetermined threshold, the calculations including a calculation of attenuation values for each pixel;

II) a second group of network planning steps comprising at least
   a) identifying a Service Area in each of the Domains on the basis of the offered-service traffic values, each Service Area including a set of pixels in which specific network services can actually be provided in accordance with the CDMA access techniques, each Service Area being identified by
      a1) selecting for each Domain the pixels to be inserted into the respective Service Area according to a sequence determined on the basis of attenuation values calculated for each pixel of the Domain during step Ib and
      a2) iteratively adding to the Service Area on the basis of the sequence the selected pixels in terms of offered-service traffic values associated with each of the pixels until a predetermined limit is reached or the pixels of the Domain are all added to the Service Area.

2. The method in accordance with claim 1 wherein the predetermined limit is representative of a maximum loading factor set for the Service Area.

3. The method in accordance with claim 1 wherein step IIa also comprises the step of
   IIa3) verifying pixel-by-pixel and for each of the specific network services whether the mobile terminals have characteristics that are compatible with a specific network service provided in the Service Area.

4. The method in accordance with claim 3 wherein the step IIa3 further comprises the step of
   identifying, in cases where the characteristics of the mobile terminals are not compatible with the specific network service, a Domain compatible with the characteristics of the mobile terminal, and
   assigning the mobile terminal to the Service Area of the cell compatible with the specific network service.

5. The method in accordance with claim 3, further comprising a verification step comprising at least
   calculating uplink carrier to interference ratio (C/I) values for each pixel and for each specific network service; and
   verifying whether the carrier to interference ratio satisfies the requirements of the specific network service.

6. The method of claim 3, wherein the step IIa3 of verifying pixel-by-pixel and for each of the specific network services whether the mobile terminals have characteristics that are compatible with a specific network service provided in the Service Area includes performing the verification iteratively starting from the pixels showing the highest attenuation values and proceeding towards the antenna in order of decreasing attenuation values.

7. The method in accordance with claim 1 wherein step II also comprises
   IIb) identifying Macrodiversity Areas or a pixel location in the geographical area where the mobile terminal is capable of decoding the radio-frequency signal originating from the antenna radiating the signal.

8. The method in accordance with claim 7 wherein the step IIb comprises analyzing pixel-by-pixel, for each Service Area, pixels that are outside the Service Area but inside the corresponding Domain, and checking whether the pixels can be served using Macrodiversity by at least one adjacent Service Area.

9. The method defined in claim wherein the sequence is determined for each Domain by starting with the pixel with the lowest attenuation value and ending with the pixel with the highest attenuation value among the pixels belonging to the Domain.

10. A processing system programmed to perform:
    estimating values of offered-service traffic for each of a plurality of pixels;
    calculating a Domain in each of a plurality of Coverage Areas, each Domain including pixel locations in which a radiated radio-frequency signal exceeds a predetermined threshold, the calculations including a calculation of attenuation values for each pixel; and
    identifying a Service Area in each of the Domains on the basis of the offered-service traffic values, each Service Area including a set of pixels in which specific network services can actually be provided in accordance with CDMA access techniques, each Service Area being identified by
       selecting for each Domain the pixels to be inserted into the respective Service Area according to a sequence determined on the basis of attenuation values calculated for each pixel of the Domain, and
       iteratively adding to the Service Area on the basis of the sequence the selected pixels in terms of offered-service traffic values associated with each of the pixels until a predetermined limit is reached or the pixels of the Domain are all added to the Service Area.

11. A computer-readable medium having stored thereon instructions that, when executed by a computer, perform:
    estimating values of offered-service traffic for each of a plurality of pixels;
    calculating a Domain in each of a plurality of Coverage Areas, each Domain including pixel locations in which a radiated radio-frequency signal exceeds a predetermined threshold, the calculations including a calculation of attenuation values for each pixel; and
    identifying a Service Area in each of the Domains on the basis of the offered-service traffic values, each Service Area including a set of pixels in which specific network services can actually be provided in accordance with CDMA access techniques, each Service Area being identified by
       selecting for each Domain the pixels to be inserted into the respective Service Area according to a sequence determined on the basis of attenuation values calculated for each pixel of the Domain, and
       iteratively adding to the Service Area on the basis of the sequence the selected pixels in terms of offered-service traffic values associated with each of the pixels until a predetermined limit is reached or the pixels of the Domain are all added to the Service Area.

12. A method for identifying Macrodiversity Areas or pixel locations where a mobile terminal is capable of decoding radio-frequency signals originating from a plurality of antennas of a telecommunications network for mobile terminals, the network employing CDMA access techniques and comprising a plurality of Coverage Areas in a geographical area, each Coverage Area including at least one of the plurality of antennas that radiates a radio-frequency signal and of a plurality of elementary geographical areas or pixels in which the radio-frequency signal is received by the mobile terminals, the method comprising the steps of:
   a) calculating a Domain in each of the Coverage Areas, the Domain including pixel locations in which the radio-frequency signal exceeds a predetermined threshold, the calculations including a calculation of attenuation values for each pixel of the Domain;
   b) identifying a Service Area for each of the Domains by determining a set of pixels in which specific network services can actually be provided in accordance with the access technique, the Service Area further being identified by
       selecting for each Domain the pixels to be inserted into the respective Service Area according to a sequence determined on the basis of attenuation values calculated for each pixel of the Domain during step a), and
       iteratively adding to the Service Area on the basis of the sequence the selected pixels in terms of offered-service traffic values associated with each pixel until a predetermined limit is reached or the pixels of the Domain are all added to the Service Area;
   c) analyzing for each Service Area pixels that are outside the Service Area but inside the corresponding Domain; and
   d) checking whether the pixels can be served using Macrodiversity by at least one adjacent Service Area.

13. A processing system programmed to perform:
calculating a Domain in each of a plurality of Coverage Areas, each Domain including pixel locations in which a radiated radio-frequency signal exceeds a predetermined threshold, the calculations including a calculation of attenuation values for each pixel of the Domain;
identifying a Service Area for each of the Domains by determining a set of pixels in which specific network services can actually be provided in accordance with CDMA access techniques, the Service Area further being identified by
selecting for each Domain the pixels to be inserted into the respective Service Area according to a sequence determined on the basis of attenuation values calculated for each pixel of the Domain, and
iteratively adding to the Service Area on the basis of the sequence the selected pixels in terms of offered-service traffic values associated with each pixel until a predetermined limit is reached or the pixels of the Domain are all added to the Service Area;
analyzing for each Service Area pixels that are outside the Service Area but inside the corresponding Domain; and
checking whether the pixels can be served using Macrodiversity by at least one adjacent Service Area.

14. A computer-readable medium having stored thereon instructions that, when executed by a computer, perform:
calculating a Domain in each of a plurality of Coverage Areas, each Domain including pixel locations in which a radiated radio-frequency signal exceeds a predetermined threshold, the calculations including a calculation of attenuation values for each pixel of the Domain;
identifying a Service Area for each of the Domains by determining a set of pixels in which specific network services can actually be provided in accordance with CDMA access techniques, the Service Area further being identified by
selecting for each Domain the pixels to be inserted into the respective Service Area according to a sequence determined on the basis of attenuation values calculated for each pixel of the Domain, and
iteratively adding to the Service Area on the basis of the sequence the selected pixels in terms of offered-service traffic values associated with each pixel until a predetermined limit is reached or the pixels of the Domain are all added to the Service Area;
analyzing for each Service Area pixels that are outside the Service Area but inside the corresponding Domain; and
checking whether the pixels can be served using Macrodiversity by at least one adjacent Service Area.

15. A method for planning a telecommunications network for mobile terminals in which the network employs CDMA access techniques and comprises a plurality of Coverage Areas in a geographical area, each Coverage Area comprising antennas that radiate a radio-frequency signal and a plurality of elementary geographical areas or pixels in which the radio-frequency signal is received by the mobile terminals, the method comprising:
I) a first group of data preparation steps comprising at least
  a) estimating values of offered service traffic for each of the pixels, and
  b) calculating for each of the Coverage Areas a Domain including pixel locations in which the radio-frequency signal exceeds a predetermined threshold, the calculations including a calculation of attenuation values for each pixel of the Domain;
II) a second group of network planning steps comprising at least
  a) identifying a Service Area for each of the Domains on the basis of the offered service traffic values, the Service Area including a set of pixels in which specific network services can actually be provided in accordance with the CDMA access techniques, the Service Area being identified
    a1) selecting, for each Domain, the pixels to be inserted into the respective Service Area according to a sequence determined on the basis of attenuation values calculated for each pixel of the Domain during step Ib, and
    a2) iteratively adding to the Service Area on the basis of the sequence the selected pixels in terms of offered service traffic values associated to each of the pixels until a predetermined limit is reached or the pixels of the Domain are all added to the Service Area.

16. The method defined in claim 15 wherein the sequence is determined for each Domain by starting with the pixel with the lowest attenuation value and ending with the pixel with the highest attenuation value among the pixels belonging to the Domain.

17. A method for identifying Macrodiversity Areas or pixel locations where a mobile terminal is capable of decoding radio-frequency signals originating from a plurality of antennas of a telecommunications network for mobile terminals, the telecommunication network employing CDMA access techniques and comprising a plurality of Coverage Areas in a geographical area, each Coverage Area including at least one of the plurality of antennas that radiates a radio-frequency signal and of a plurality of elementary geographical areas or pixels in which the radio-frequency signal is received by the mobile terminals, the method comprising the steps of:
  a) calculating for each of the Coverage Areas a Domain including pixel locations in which the radio-frequency signal exceeds a predetermined threshold, the calculations including a calculation of attenuation values for each pixel of the Domain;
  b) identifying a Service Area for each of the Domains by determining a set of pixels in which specific network services can actually be provided in accordance with the access technique, the Service Area being identified by
    selecting for each Domain the pixels to be inserted into the respective Service Area according to a sequence determined on the basis of attenuation values calculated for each pixel of the Domain during step Ia), and
    iteratively adding to the Service Area, on the basis of the sequence, the selected pixels in terms of offered service traffic values associated to each of the pixels until a predetermined limit is reached or the pixels of the Domain are all added to the Service Area;
  c) analyzing for each Service Area pixels that are outside the Service Area but inside the corresponding Domain; and
  d) checking whether the pixels can be served using Macrodiversity by at least one adjacent Service Area.

* * * * *

UNITED STATES PATENT AND TRADEMARK OFFICE
CERTIFICATE OF CORRECTION

PATENT NO. : 7,596,377 B2  Page 1 of 1
APPLICATION NO. : 10/415254
DATED : September 29, 2009
INVENTOR(S) : Sergio Barberis et al.

It is certified that error appears in the above-identified patent and that said Letters Patent is hereby corrected as shown below:

In Column 13, Claim 9, Line 47:
Please delete "claim" and insert --claim 1--

In Column 16, Claim 17, Line 51:
Please delete "step Ia)" and insert --step a)--

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,596,377 B2  Page 1 of 1
APPLICATION NO. : 10/415254
DATED : September 29, 2009
INVENTOR(S) : Barberis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 300 days.

Signed and Sealed this

Twenty-eighth Day of September, 2010

David J. Kappos
*Director of the United States Patent and Trademark Office*